United States Patent
Gilchrist et al.

(10) Patent No.: US 8,223,751 B2
(45) Date of Patent: *Jul. 17, 2012

(54) METHOD AND APPARATUS FOR CONTROLLING UNSOLICITED MESSAGING

(75) Inventors: Rod Gilchrist, Oakville (CA); Richard Fogel, Toronto (CA); Robert Osborne, Toronto (CA); John Alsop, Mississauga (CA)

(73) Assignee: Watchguard Technologies, Inc., Seattle, WA (US)

( * ) Notice: Subject to any disclaimer, the term of this patent is extended or adjusted under 35 U.S.C. 154(b) by 273 days.

This patent is subject to a terminal disclaimer.

(21) Appl. No.: 12/610,978

(22) Filed: Nov. 2, 2009

(65) Prior Publication Data

US 2010/0046727 A1    Feb. 25, 2010

Related U.S. Application Data

(63) Continuation of application No. 11/019,092, filed on Dec. 21, 2004, now Pat. No. 7,613,172.

(60) Provisional application No. 60/531,983, filed on Dec. 24, 2003.

(51) Int. Cl.
*H04L 12/66* (2006.01)
*H04M 15/06* (2006.01)

(52) U.S. Cl. ........... 370/352; 235/375; 379/88.19; 379/88.22; 379/142.05; 455/456.4; 702/176; 709/202; 709/206; 709/207; 709/209; 709/229; 713/168

(58) Field of Classification Search .......... 370/352; 379/142.05, 88.19, 88.22; 709/206, 207, 709/202, 203, 209, 229; 235/375; 455/456.4; 702/176; 713/168

See application file for complete search history.

(56) References Cited

U.S. PATENT DOCUMENTS

| | | | |
|---|---|---|---|
| 5,822,416 A | 10/1998 | Goodacre et al. | |
| 5,872,779 A | 2/1999 | Vaudreuil | |
| 6,052,709 A * | 4/2000 | Paul | 709/202 |
| 6,067,546 A | 5/2000 | Lund | |
| 6,112,227 A * | 8/2000 | Heiner | 709/203 |
| 6,330,590 B1 * | 12/2001 | Cotten | 709/206 |
| 6,334,143 B2 | 12/2001 | Kowaguchi | |
| 6,393,464 B1 * | 5/2002 | Dieterman | 709/206 |
| 6,421,669 B1 | 7/2002 | Gilmour et al. | |
| 6,421,709 B1 * | 7/2002 | McCormick et al. | 709/206 |
| 6,460,050 B1 | 10/2002 | Pace et al. | |
| 6,484,197 B1 * | 11/2002 | Donohue | 709/206 |

(Continued)

OTHER PUBLICATIONS

Kirstein, P., et al., "SIP Security Using Public Key Algorithms," Internet Engineering Task Force, Internet Draft, Mar. 12, 1998, draft-ietf-mmusic-sip-sec-00.txt., 29 pgs.

(Continued)

*Primary Examiner* — Gerald Gauthier
(74) *Attorney, Agent, or Firm* — Kory D. Christensen; Stoel Rives LLP

(57) ABSTRACT

Sensor nodes (or addresses therefore), acting as real-time message decoys, are distributed across a real-time communications network to attract unsolicited real-time messages. Filtering rules are derived from the message characteristics (such as the source address) and messaging content of the traffic encountered at the sensor nodes. The filtering rules are distributed to filtering agents positioned in the communications network in such a way that they can filter traffic for legitimate users. The filtering agents may identify and control the disposition of real-time messaging traffic that is part of a mass communication campaign on behalf of legitimate users of the real-time messaging communication system. Disposition may include suppressing, diverting, or labeling.

8 Claims, 4 Drawing Sheets

U.S. PATENT DOCUMENTS

| | | |
|---|---|---|
| 6,507,866 B1 | 1/2003 | Barchi |
| 6,532,489 B1 | 3/2003 | Merchant |
| 6,539,385 B1 | 3/2003 | Pollack et al. |
| 6,546,390 B1 | 4/2003 | Pollack et al. |
| 6,546,416 B1 * | 4/2003 | Kirsch ................. 709/206 |
| 6,571,238 B1 | 5/2003 | Pollack et al. |
| 6,571,275 B1 * | 5/2003 | Dong et al. ............ 709/209 |
| 6,578,025 B1 | 6/2003 | Pollack et al. |
| 6,615,242 B1 * | 9/2003 | Riemers ................. 709/206 |
| 6,622,909 B1 * | 9/2003 | Thomas et al. .......... 235/375 |
| 6,654,787 B1 * | 11/2003 | Aronson et al. ......... 709/206 |
| 6,721,785 B1 * | 4/2004 | Raghunandan ........... 709/206 |
| 6,732,149 B1 * | 5/2004 | Kephart ................. 709/206 |
| 6,769,016 B2 * | 7/2004 | Rothwell et al. ......... 709/206 |
| 6,772,196 B1 * | 8/2004 | Kirsch et al. ........... 709/206 |
| 6,778,941 B1 * | 8/2004 | Worrell et al. .......... 702/176 |
| 6,826,618 B2 * | 11/2004 | Morris et al. ........... 709/229 |
| 6,829,635 B1 * | 12/2004 | Townshend ............. 709/206 |
| 7,170,879 B2 | 1/2007 | Kim |
| 7,231,219 B2 * | 6/2007 | Curtis et al. ........... 455/456.4 |
| 7,245,609 B2 | 7/2007 | D'Eletto |
| 7,382,868 B2 | 6/2008 | Moore et al. |
| 7,480,723 B2 | 1/2009 | Grabelsky et al. |
| 7,525,951 B2 | 4/2009 | Musil et al. |
| 7,610,340 B2 * | 10/2009 | Kelley et al. ........... 709/206 |
| 7,613,172 B2 * | 11/2009 | Gilchrist et al. ......... 370/352 |
| 7,613,923 B2 * | 11/2009 | Gilchrist et al. ......... 713/168 |
| 7,734,708 B1 * | 6/2010 | Fletcher ............... 709/207 |
| 7,996,470 B2 * | 8/2011 | Daniell ................. 709/206 |
| 8,150,002 B2 * | 4/2012 | Gilchrist et al. ......... 379/88.19 |
| 2001/0005372 A1 | 6/2001 | Cave et al. |
| 2001/0005382 A1 | 6/2001 | Cave et al. |
| 2003/0193930 A1 | 10/2003 | Wotherspoon et al. |
| 2003/0214940 A1 | 11/2003 | Takken |
| 2004/0105529 A1 | 6/2004 | Salvucci et al. |
| 2005/0094623 A1 | 5/2005 | D'Eletto |
| 2005/0141486 A1 * | 6/2005 | Gilchrist et al. ......... 370/352 |
| 2005/0201363 A1 * | 9/2005 | Gilchrist et al. ......... 370/352 |
| 2005/0232160 A1 | 10/2005 | Kotik et al. |
| 2010/0046723 A1 * | 2/2010 | Gilchrist et al. ......... 379/88.22 |
| 2010/0046727 A1 * | 2/2010 | Gilchrist et al. ......... 379/142.05 |

OTHER PUBLICATIONS

Schneier, B., "Applied Cryptography," 1996, Second Edition, John Wiley & Sons, Inc., New York, pp. 21-46.

Feghhi, J., et al., "Digital Certificates, Applied Internet Security," 1999, Addison-Wesley, Reading, Massachusetts, pp. 27-89.

ITU-T Recommendation H.323, Series H: Audiovisual and Multimedia Systems, Infrastructure of Audiovisual Services—Systems and Terminal Equipment for Audiovisual Services, "Packet Based Multimedia Communications Systems," (Jul. 2003).

Postel, J., "Simple Mail Transfer Protocol," RFC 821 (Aug. 1982), pp. 1-68.

Crocker, D., "Standard for the Format of ARPA Internet Text Messages," RFC 822 (Aug. 13, 1982), pp. 1-47.

Schulzrinne, et al., "RTP: A Transport Protocol for Real-Time Applications," RFC 1889 (Jan. 1996) pp. 1-75.

Freed, N., et al., "Multipurpose Internet Mail Extensions (MIME) Part One: Format of Internet Message Bodies," RFC 2045 (Nov. 1996) pp. 1-31.

Fielding, R., et al., "Hypertext Transfer Protocol—HTTP/1.1," RFC 2068 (Jan. 1997), pp. 1-133.

Dierks, T., et al., "The TLS Protocol, Version 1.0," RFC 2246 (Jan. 1999), pp. 1-78.

Kent, S., et al., "Security Architecture for the Internet Protocol," RFC 2401 (Nov. 1998), pp. 1-53.

Handley, M., et al., "SIP: Session Initiation Protocol," RFC 2543 (Mar. 1999), pp. 1-103.

Rosenberg, J., et al., "SIP: Session Initiation Protocol," RFC 3261 (Jun. 2002), pp. 1-108.

* cited by examiner

METHOD AND APPARATUS FOR CONTROLLING UNSOLICITED MESSAGING

This application claims the benefit of U.S. Provisional Application No. 60/531,983, filed on Dec. 24, 2003, entitled "Method and Apparatus for Controlling Unsolicited Messaging in Real Time Messaging Networks," which application is hereby incorporated herein by reference.

TECHNICAL FIELD

The present invention relates to a method and system for controlling the delivery of unsolicited real-time data, voice and video messages over a communications network such as the Internet.

BACKGROUND

There are two quite different types of electronic networks that are evolving: a standard telephone network and a data network (e.g., the Internet). The standard telephone network, such as a wireless telephony network and the POTS network, is designed to carry real-time messaging content. Capacity is allocated in real-time bandwidth and, once you have a connection of adequate bandwidth established between two points, data that is delayed is viewed as a network fault. Examples of communications that may be carried via a standard telephone network(s) include voice communications, multi-party conference calls, video conference calls, or the like.

Another characteristic of standard telephone networks is that each network is typically owned and controlled by a small number (typically a single company in the case of wireless networks) of large companies that historically have provided service directly to end users of the network and therefore have a billing type relationship with them. Where a connection is made through the facilities of another provider, there is typically a commercial contract in place between the two companies. These standard telephone networks, in part because of the relatively close relationship between the service vendors and network users, have the characteristic that the originator of a call can be readily identified, allowing "caller ID" service to be readily implemented and to be widely known and in fact expected.

In contrast, the second type of network (e.g., data networks such as the Internet, LANs, WANs, VPNs, and the like) were designed to move mostly one-way, non-real time data from point to point. In this type of network, the delay of data has typically not been regarded as a network fault. Additionally, some data networks, particularly the Internet, are far more disjoint than a standard telephone network. There are many more companies involved, and there is much less control of individual point-to-point end-user connections. It is typical that a company that provides transmission of data on the Internet has a tenuous commercial relationship with the originators of most of the data packets that it is carrying. In fact, Internet service providers (ISPs) protect the privacy and anonymity of their subscribers.

This tenuous commercial relationship with end users coupled with the relative ease with which the end-user computers that originate much of the traffic on the Internet can be anonymously enlisted in the service of third parties, leads to the fact that a "caller ID" type service is nearly impossible to implement on the Internet.

In recent years, these data networks have begun to evolve to provide real-time, two-way communications between parties. The communications may include, for example, voice-over-IP (VOIP), instant messaging, interactive video conferencing (e.g., web meetings), or the like.

Using the electronic data networks for real-time, two-way communications provide several advantages. In particular, using these electronic networks for real-time, two-way communications is relatively low cost and easily accessible. The proliferation of networks throughout today's society, particularly the Internet, has ensured ready access to a communications device capable of communicating with any other individual communicatively coupled to the same network. Essentially anyone with a computer, a personal data assistant, a wireless telephone, or the like can connect to the Internet and communicate with someone at a remote location within seconds. Likewise, companies can use internal networks (e.g., WANs, VPNs, or the like) to allow geographically dispersed employees to communicate in real-time using many of the same technologies. Notably, the communications can frequently occur with equipment already purchased as networks and access devices are generally already in place to handle data needs.

As this type of communications becomes more widespread, it will inevitably become a target for advertisers and telemarketers as a method to distribute advertising messages in vast quantities. Because of the low cost of distributing massive amounts of advertising, advertisers can economically transmit advertising communications with response rates that are orders of magnitude less than would be necessary to support more traditional means of advertising. Additionally, as discussed above, anonymity given the sender prevents "do not call" lists and caller-ID type mechanisms from providing an adequate solution.

Electronic mail (e-mail) has already seen this problem. E-mail is a store-and-forward communications method in which one-way communications (as opposed to a two-way communications) are sent from one network node to another network node until the final destination is reached, where a recipient may or may not retrieve a message or respond. Because e-mail is inexpensive and advertisers can transmit massive amounts of e-mail quickly (and often automatically), e-mail advertisements (e.g., junk e-mail) are becoming a burden to networks and users alike. This use of e-mail to send massive amounts of advertisements is known as the e-mail "spam" problem.

Attempts have been made to reduce the effect of e-mail spam on the end users. One such attempt is described in U.S. Pat. No. 6,052,709, wherein a system that attempts to filter incoming e-mail to identify junk e-mail is described. This system, however, only applies to e-mail, which, as described above, is a one-way communication, and does not apply to two-way, real-time communications, such as voice, video, real-time text, or the like.

Therefore, there is a need for a method and system to identify and filter unsolicited real-time, two-way communications.

SUMMARY OF THE INVENTION

These and other problems are generally solved or circumvented, and technical advantages are generally achieved, by preferred embodiments of the present invention which provides a system and method for controlling the delivery of unsolicited real-time messages over an electronic communications network.

In accordance with an aspect of the invention, there is provided a method for detecting, identifying and filtering unsolicited real-time messaging (RTM) messages. Generally, the method may comprise the following steps.

a.) Creating a sensor/decoy destination address, each destination address being capable of receiving RTM messages, but no destination address is intended to receive RTM messages destined for an actual user. Because there is no actual user associated with the destination address, all RTM messages involving that destination address are unsolicited.

b.) Monitoring the RTM messages received at the destination addresses. Each RTM message received at the destination address is analyzed for information such as content and originating address information that could be useful in identifying that particular message or other traffic from that source if it were to arrive at an RTM terminal device.

c.) Collecting and processing information related to the RTM messages received at the destination address and downloading processed information into control agents situated at network nodes through which RTM traffic flows to reach protected terminal devices. The downloaded information is used to filter incoming RTM messages.

BRIEF DESCRIPTION OF THE DRAWINGS

In order that the invention may be readily understood, embodiments of the invention are illustrated by way of examples in the accompanying drawings, in which.

DETAILED DESCRIPTION OF ILLUSTRATIVE EMBODIMENTS

This section describes the instant invention with reference to the accompanying figures. The description uses a number of terms that are defined more precisely in the following paragraphs.

The following description discloses a system and method for controlling unsolicited real-time, two-way communications, referred to herein as real-time messaging (RIM). RTM may include, for example, any messaging modality that may be used in an interactive two-way conversational mode between a plurality of communicating parties. RTM may also be used to send messages to a message store (i.e., a voice mailbox or integrated messaging mailbox), but it is distinguished from electronic mail (i.e., e-mail) in that it is designed to support two-way conversation. In an embodiment, RTM may be supported by protocols wherein the communications session is established using SIP or H.323 and messaging is done via one or more of voice, video, text, whiteboard, multimedia data streams, or the like. Examples of RTM include Voice over Internet Protocol ("VOIP"), video conferencing, Instant Messaging ("IM"), traditional voice calls via plain old telephone service (POTS) network, voice calls via a wireless network, or the like.

Figure 1:
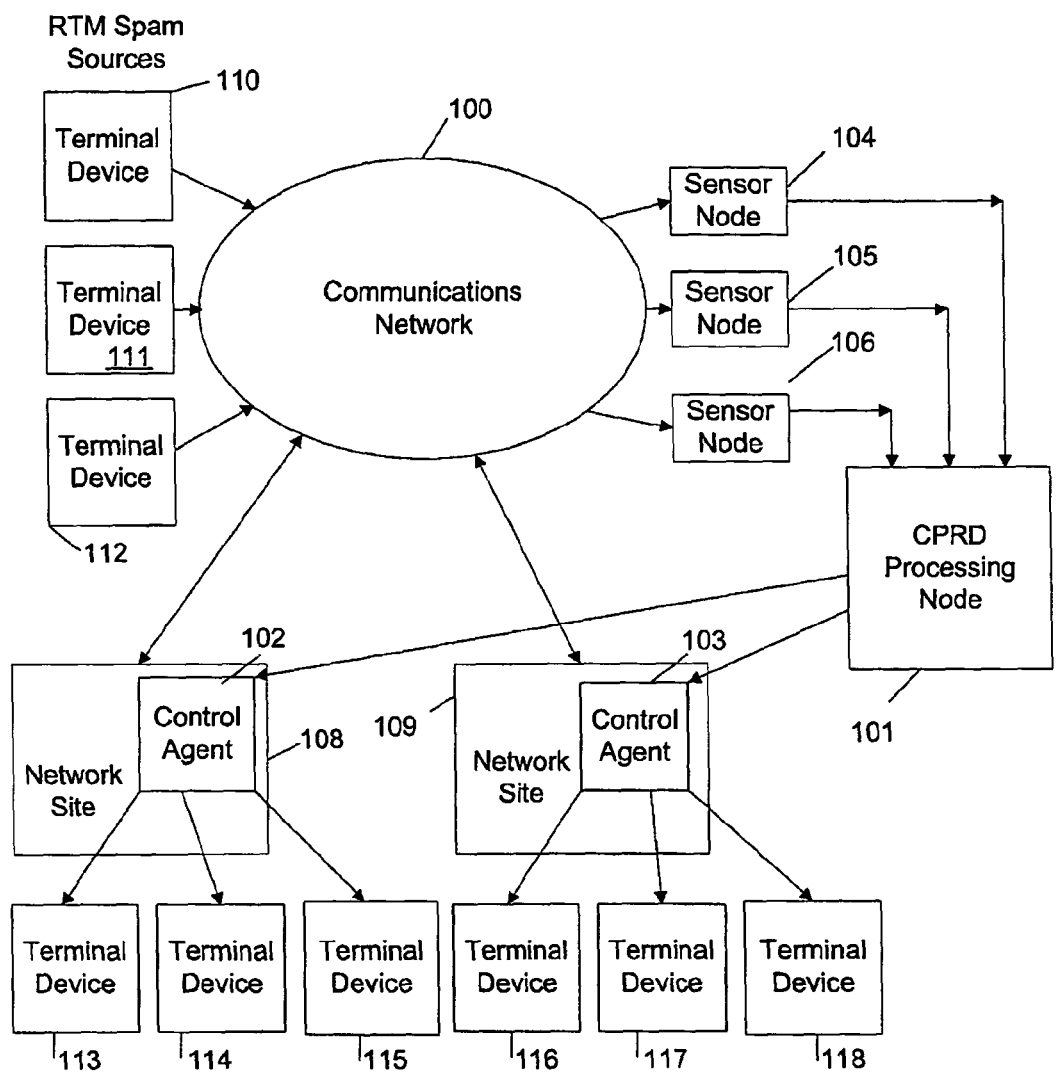
FIG. 1 is a block diagram of the architecture for controlling the delivery of unsolicited RTM communications according to an embodiment of the present invention.

FIG. 1 illustrates the overall architecture and the communications context of an embodiment of the instant invention.

In normal operation of the real-time messaging network, user terminal devices 113-118 participate in RTM communications via a RTM capable network 100 such as the Internet, a WAN (wide-area network), or the like. In another embodiment, the RTM capable network 100 may be a telephony network, e.g., POTS network or a wireless network, capable of carrying real-time voice communications between parties. As discussed in greater detail below, this alternative embodiment may be particularly useful for a telephony service provider to block unsolicited telephone calls, such as telemarketing calls, directed to its subscribers.

The terminal devices 113-118 typically connect to the network 100 via a service provider who typically operates one or more network nodes (e.g., 108-109) through which RTM traffic flows. Similar to a telephone number, an RTM message is communicated using a RTM address to identify an intended RTM message recipient and, usually, a RTM address to identify the actual sender. A terminal device is configured for communications using at least one RTM address to identify the terminal device to network. Like a telephone number, a RTM network user may have more than one RTM address. It should be noted that the terminal devices may be any component capable of originating and/or receiving RTM communications. In particular, the terminal devices may be, for example, a physical device such as a cell phone, a telephony handset, a computer-based communications device, or the like. The terminal device may also be a computer program executing on an electronic device.

Terminal devices (e.g., 113-118) are coupled to a respective network site (e.g., 108, 109) via one or more of wireless and wired connections. In the case of a terminal device comprising a wire-coupled telephony handset or a personal computer, the terminal device may always connect through the same network nodes. For the case of a wireless-coupled terminal device, the network nodes through which that terminal device's RTM traffic passes may change as the terminal device's user moves the device.

Coupled to network 100 are terminal devices 110-112 that utilize RTM to originate unsolicited real-time, two-way communications. Devices 110-112 are typically connected to network 100 in a similar manner as user terminal devices 113-118. In this case the network nodes that the terminal devices 110-112 connect through are not explicitly shown in the diagram, but are included as part of the communications network 100 itself.

In accordance with a system aspect of the present invention, FIG. 1 shows a representative plurality of sensor nodes 104-106 connected to the communications network 100, such as in the same manner as the user terminal devices 113-118 and the RTM originating terminal devices 110-112. Sensor nodes 104-106 are also coupled to a collection, processing and rule distribution (CPRD) node 101. CPRD node 101 in turn is coupled for communications with a representative plurality of control agents 102-103. Control agents 102-103 are illustrated as residing in network nodes 108-109 through which RTM traffic must flow to reach protected user terminal devices 113-118. However, persons of ordinary skill in the art will appreciate that control agents 102-103 may reside elsewhere, such as between network nodes 108-109 and terminal devices 113-118, or alternately within terminal devices 113-118 themselves.

Though CPRD 101 is illustrated as communicating with sensor nodes 104-106, and control agents 102-103 outside communications network 100, some or all of such communications may be within such network 100.

In an embodiment, sensor nodes 104-106 may comprise computer programs running on a computer (or other electronic devices) or network of computers (all not shown) that accepts connections for one or more RTM addresses that do not actually correspond to an actual user of a RTM network such as network 100. Because the RTM address does not correspond to an actual user, all communications received at that address are by definition unsolicited. A sensor node 104-106, however, may run on the same computer or be part of the same computer program that also accepts RTM message traffic for actual users or reside on a CPRD node 101. The sensor nodes collect information on RTM message traffic and communicate information about these RTM messages to the CPRD node 101, for example, over the same communications network 100.

Sensor nodes 104-106 are preferably distributed throughout the communications network 100 to ensure that as many delivery paths as possible of RTM communications are represented and that a large number of representative RTM communication sessions can be examined. Sensor nodes 104-106 collect information on this received RTM traffic to aid in identification of the source and nature of the RTM communications.

It is expected that many unsolicited RTM messages will exist whose source will be various terminal devices 110-112 dedicated to the sending, both via manual and automatic methods, of unsolicited RTM messages. It is also expected that many of the unsolicited RTM messages will be sent from the computers of actual users that have been taken over via a virus or other attack and are then used to send unsolicited RTM messages until they are discovered and repaired. It is further expected that the source of the unsolicited RTM messages will change rapidly.

When RTM messages are collected by the sensor nodes 104-106, the RTM messages or characteristics determined from the RTM messages are forwarded to the CPRD node 101 for processing and analysis.

Figure 2:
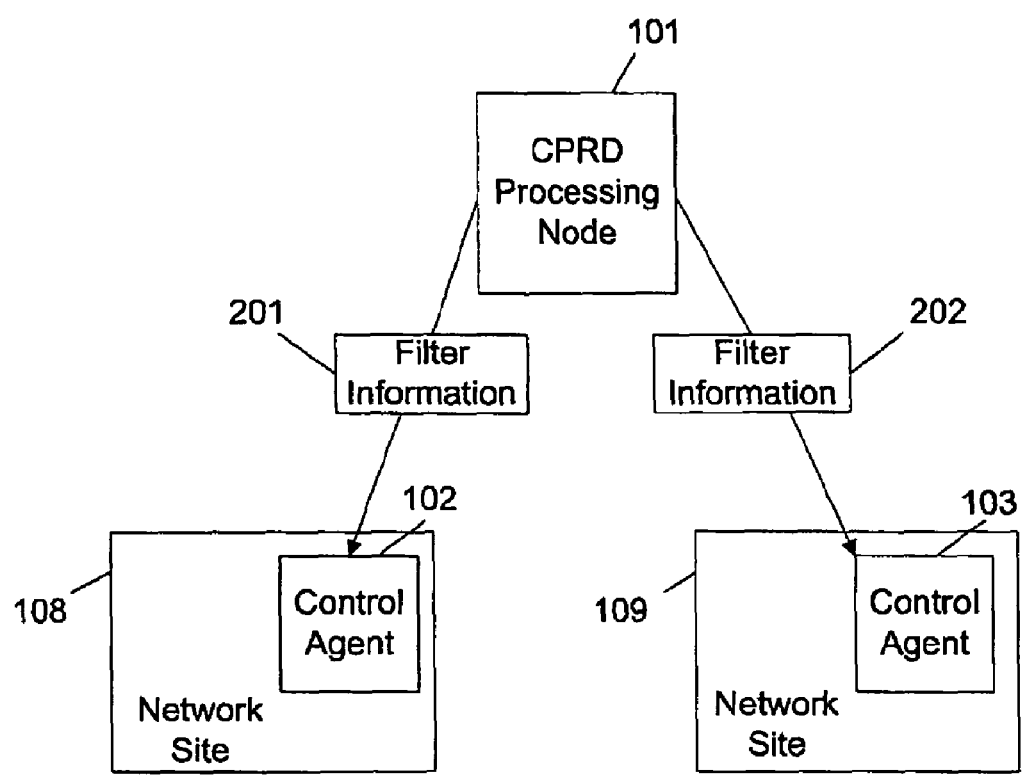
FIG. 2 is a block diagram showing a portion of FIG. 1 in detail, illustrating the communication of filter rules from a processing center to site control agents.

As illustrated in FIG. 2, if the RTM message is determined by the CPRD node 101 to be an unsolicited RTM, the characteristics of this RTM message, such as its header, content, and any other identifying information will be used to develop filter rules 201-202 which may then be used to identify and control an RTM message received for a terminal device 113-118 of a real user.

Because RTM traffic is typically two-way interactive communications, it is preferred that the sensor nodes 104-106, acting as decoys for unsolicited RTM traffic, employ various strategies to emulate the behavior that would be observed if the RTM address was in fact the address of an actual user. This includes displaying a network 'presence' (e.g., indicating that the 'user' is on-line and ready to interact) and, possibly, playing a recorded message to emulate a user interaction such as saying, "Hello" and/or offering access to an RTM account.

CPRD node (of which there can be several and which, for optimizing effectiveness, may share message and filter rule store data) comprises one or more computers running one or more programs. In a preferred embodiment, the CPRD node collects information from the sensor nodes that is relevant to identifying RTM messages. The CPRD node may then store and analyze the RTM message information to derive rules that can reliably distinguish the RTM messages observed at a sensor node from legitimate RTM traffic received by terminal devices employed by actual users.

For example, CPRD node 101 examines the RTM message characteristics such as the header of the message which can contain information on the sender such as their network IP address, media type, routing information and other identifying characteristics. In an embodiment in which the RTM message comprises voice communications, for example, the message characteristics may include caller identifier and/or source location information. Generally, the header information helps determine the source of the RTM message.

If one or more unsolicited RTM messages originate from the same originating address (e.g., the same IP address, caller identifier, etc.), then that originating address can be determined to be a unsolicited RTM source. The more messages are traced to that originating address, the more credible is the determination that the source is originating unsolicited RTM messages. However, because some unsolicited RTM messages are often sent from computers that have been compromised for the purpose of sending spam, it is preferable not to make the unsolicited RTM source judgment permanent, but rather to have it expire over a period of time (e.g., minutes, hours or days) if no further unsolicited RTM traffic is observed.

As illustrated in FIG. 2, if the RTM message is determined by the processing center 101 to be an unsolicited RTM message, the characteristics of this message, such as its header, content, and any other identifying information will form or determine the core of the filter rules 201-202 that are distributed to the control agents 102-103. Filter rules 201-202 comprise information useful to successfully block a particular unsolicited RTM message from reaching its destination.

The filter rules 201-202 are stored at the CPRD node 101 and tested to ensure that they are specific to the observed RTM traffic and that they do not trigger on legitimate RTM traffic. Filter rules 201-202 can be generated automatically, and can also be generated and validated via human input. Preferably, filter rules 201-202 are aged by CPRD node 101 and discarded after a period (e.g., days, weeks or months) as mass messaging campaigns end.

CPRD node 101 may also distribute rule information 201-202 to control agents 102-103 that filter RTM traffic in various ways if the traffic is sufficiently similar to RTM traffic that was observed at one or more of sensor nodes 104-106. Filter rule data is maintained at CPRD node 101 and may be distributed to the control agents 102-103 incrementally as new rules are generated, or all at once if a node's 101 or agent's 102-103 rule store is reset or a new control agent is brought on-line.

Control agents 102-103 identify unsolicited RTM messages and control it for respective users of terminal devices 113-118. For example, control agents 102-103 may separate incoming RTM traffic into messages that are to be received without modification or labeling (i.e., legitimate RTM messages) and those that are to be controlled further such as by rejecting, suppressing, diverting, or simply labeling according to the nature of their contents.

Figure 3:
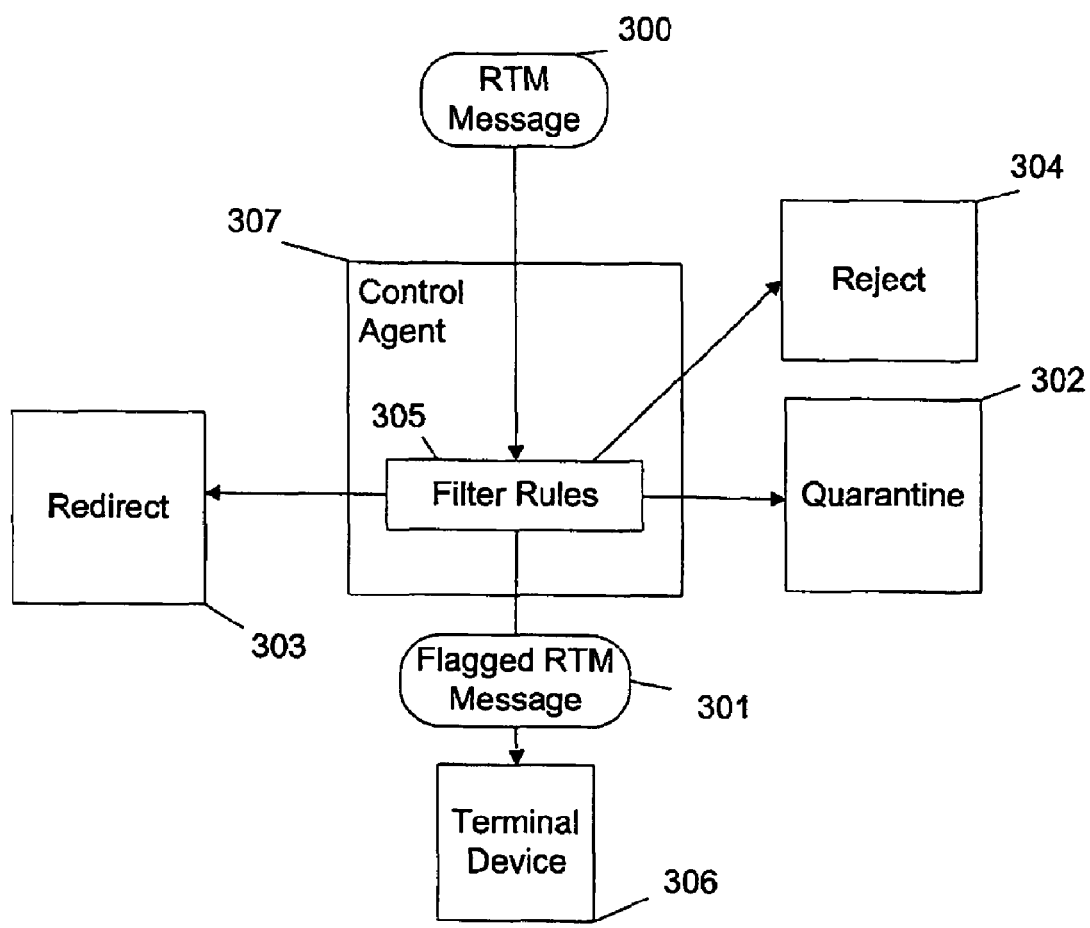
FIG. 3 is a block diagram showing a portion of FIG. 2 in detail illustrating how a site control agent alters the destination or content of an unsolicited RTM message using filtering rules.

As demonstrated in FIG. 3, a control agent 307 applies filter rules 305 to incoming RTM messages 300 (e.g., VOIP message). This processing occurs before the message is delivered to the destination terminal device 306. For those RTM messages 300 determined to be unsolicited, control agent 307 applies a specific disposition 301-304 to the message, rejecting the message 304, suppressing it by recording it and saving it in a quarantine store 302, redirecting the message to an alternate location 303, or flagging the RTM message 301 in such a way as to label it as unsolicited when it is delivered to the terminal device 306. Disposition of a particular RTM message 300 may vary depending on the type or content of the RTM message.

Dispositions may be determined by control agent 307 based on a 'degree of certainty' metric contained in a filter rule 305, depending on the configuration of the control agent 307. The user of a terminal device 306 may examine RTM messages 300 disposed to the quarantine store 302 and return any erroneously classified messages to the CPRD node.

A protected terminal device 306 will receive an unsolicited RTM message if the control agent 307 is configured to label or flag the message as unsolicited, rather than reject or divert the message to alternate locations. The flagged message 301 can then be dealt with by the terminal device as per its configuration. Though not shown, messages which do not instigate disposition as unsolicited messages in accordance with the filter rules are delivered to terminal device 306.

Figure 4:
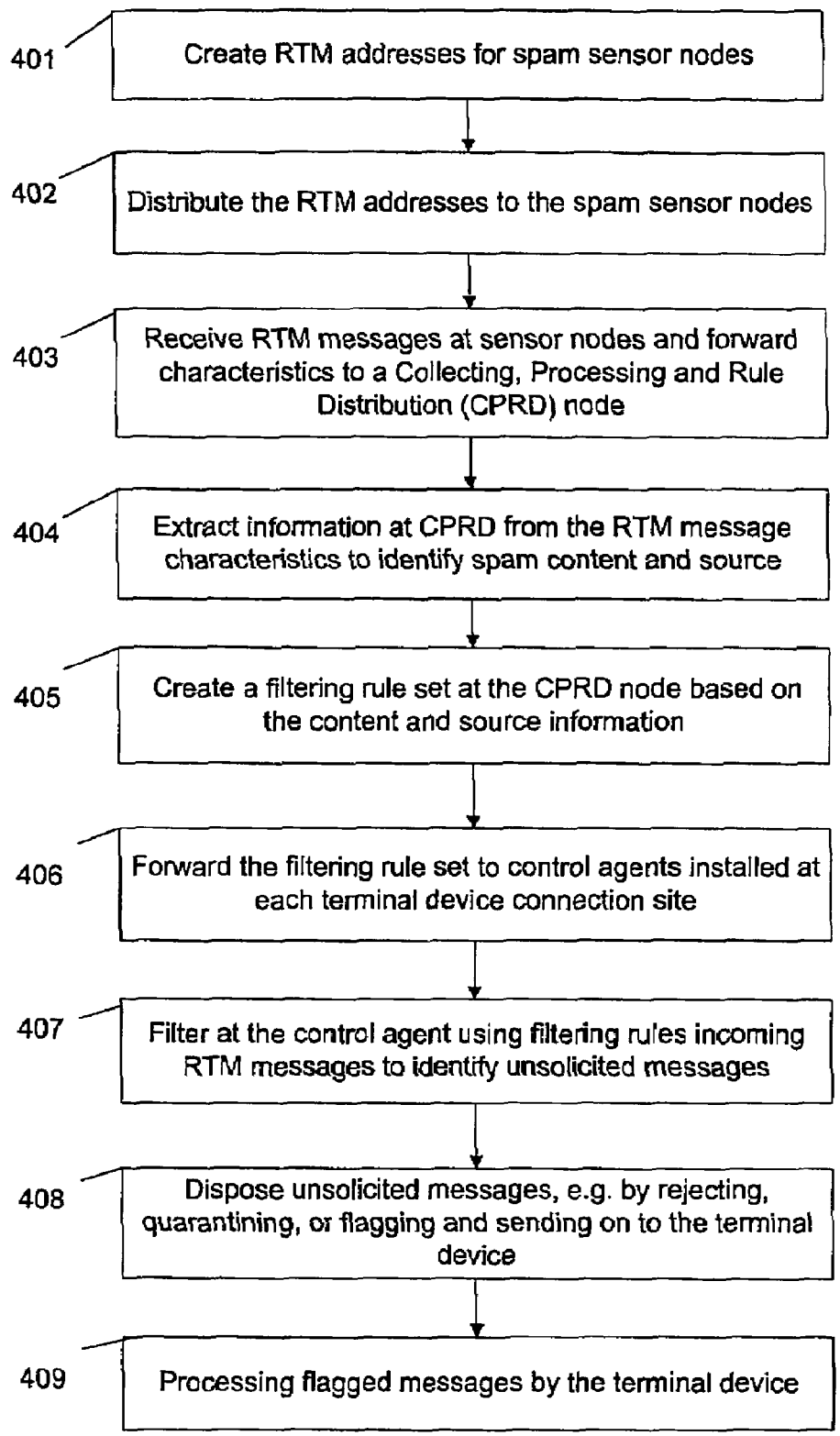
FIG. 4 is a process flow chart for a method of identifying and controlling delivery of unsolicited RTM messages in accordance with an embodiment of the invention.

With reference to FIG. 4, there is illustrated a method of controlling delivery of unsolicited RTM messages according to an embodiment of the present invention. At step 401, a plurality of unsolicited RTM sensor node addresses are created for receiving unsolicited RTM traffic. At step 402, the RTM spam sensor node addresses are distributed to one or more sensor nodes in a communications network for communicating RTM messages.

At step 403, one or more of the sensor nodes receives RTM messages and forwards the messages to a CPRD node. At step 404 the CPRD node, extracts data from the RTM message to identify its content and source. At step 405, a filtering rule set is created based on the source and content information of the spam RTM message, and at step 406, the filtering rule set is forwarded to control agents installed at one or more terminal device connection sites. At step 407, the control agents filter incoming RTM messages with the filtering rules to identify unsolicited RTM messages, and at step 408, the control agent acts upon the unsolicited RTM messages. Acting upon the message may involve rejecting it, quarantining it, labeling and sending it on to the client terminal device, or the like. At step 409, the filtered message may be further processed. For example, if it is sent to the terminal device, it may be processed by reviewing the message. If the message is quarantined, a user of the terminal device may direct it for further processing by a control agent (not shown).

As noted above, an embodiment of the present invention may be used by a telephony service provider (or other owner of a block of telephone numbers or URLs) to block unsolicited voice calls directed to its subscribers. For example, this embodiment may be useful to block telemarketers that use computerized dialing systems to automatically dial numbers within a specified address range. In this embodiment, the telephony service provider may allocate one or more system identifiers (numbers or URLs) for the purpose of identifying callers making unsolicited voice calls. The system identifiers may be, for example, a block of telephone numbers, URLs, a combination thereof, or the like.

This embodiment would be most useful in a situation where in bound calls could originate on a network like the Internet where the incoming message is much less likely to be traceable to a particular real world person or corporation.

The sensor nodes may be network nodes configured to respond to a call placed to one or more of the system call identifiers that do not correspond to actual customers, but may also be configured to respond to call identifiers corresponding to actual customers. Upon receipt of a call placed to a system call identifier, the sensor node may extract caller identification information, which may then be forwarded to the CPRD processing node. The CPRD processing node may generate filter rules and forward the filter rules to the control agents. The control agents may be a hardware and/or software component that is preferably located in the central office.

In operation, the control agents may compare calls directed to a customer with the filter rules. If a call matches one or more of the filter rules, the call may be directed to a predetermined recording or may simply be disconnected. It is preferred that the aging rules discussed above also be applied to voice calls.

Although the above description relates to specific embodiments as presently contemplated by the inventors, it is understood that the invention in its broad aspect includes mechanical and functional equivalents of the elements described herein.

What is claimed is:

1. A method for controlling unsolicited RTM calls, the method comprising:
    assigning a system identifier to a sensor node in an RTM network, wherein the system identifier assigned to the sensor node does not correspond to an actual user of the RTM network;
    receiving a first call to the system identifier of the sensor node;
    retrieving caller identification information from the first call; and
    creating one or more filter rules based upon the caller identification information, the one or more filter rules indicating that the caller identification information is a source of unsolicited RTM calls.

2. The method of claim 1, further comprising:
    receiving a second call;
    determining if the second call matches one or more of the filter rules;
    upon determining that the second call matches one or more of the filter rules, acting upon the second call; and
    upon determining that the second call does not match one or more of the filter rules, allowing the second call.

3. The method of claim 2, wherein the first and second call comprises a Voice Over Internet Protocol call.

4. The method of claim 1, wherein the call identifiers correspond to IP addresses.

5. The method of claim 1, wherein the caller identification information includes a calling telephone number or other call identifier.

6. A system for controlling unsolicited messaging in a real-time (RTM) network comprising at least one receiving terminal device adapted to receive RTM messages, said system comprising:
    a sensor node coupled to the RTM network adapted to receive RTM messages from said one or more sending terminal devices, wherein the sensor node does not correspond to an actual user of the RTM network;
    a monitoring and analysis facility coupled to the sensor node, said monitoring and analysis facility adapted to:
        collect RTM message characteristics determined from unsolicited RTM messages received by said sensor node; and
        construct filtering rules to identify and control unsolicited RTM messages, said filtering rules identifying sources of unsolicited RTM messages received at the sensor node.

7. The system according to claim 6, wherein the RTM message comprises a voice call.

8. The system according to claim 6, wherein the RTM messages include at least one of Voice Over Internet Protocol (VoIP) messaging; Instant Messaging (IM), voice communications via a POTS or wireless network, or video conferencing.

* * * * *